UNITED STATES PATENT OFFICE.

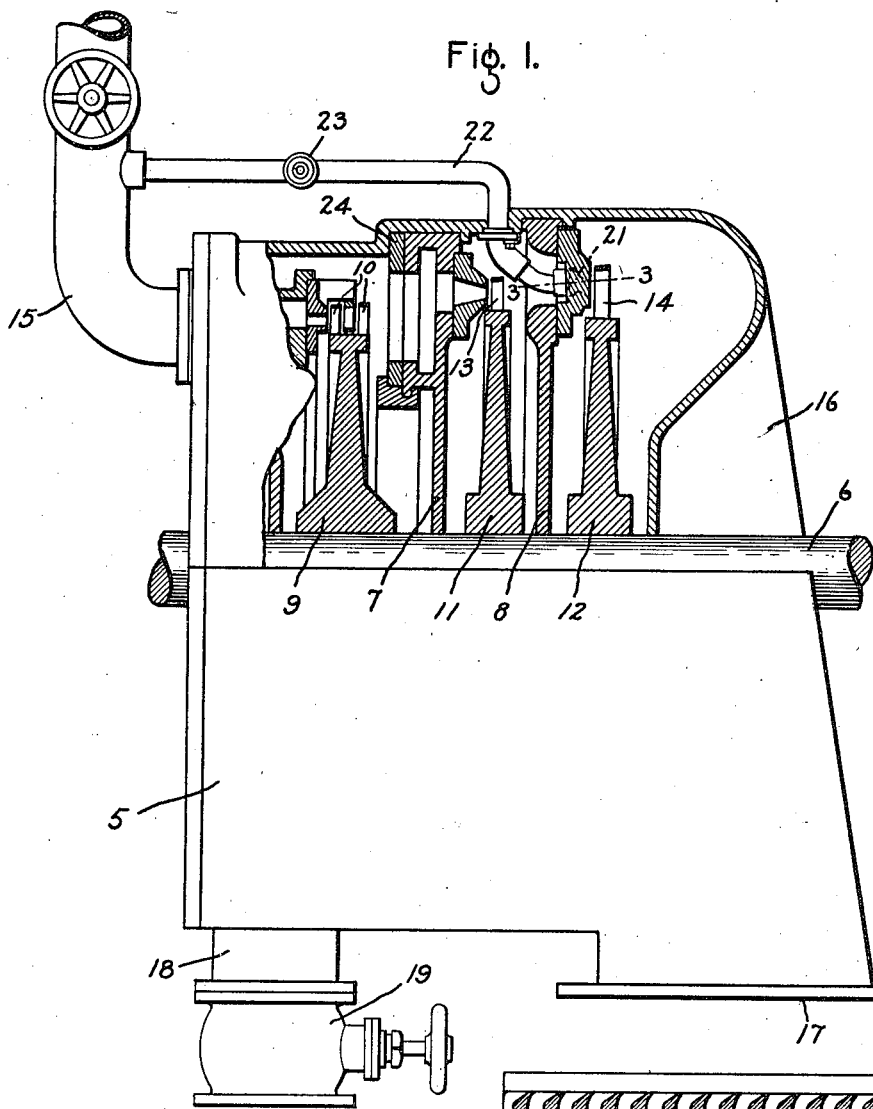
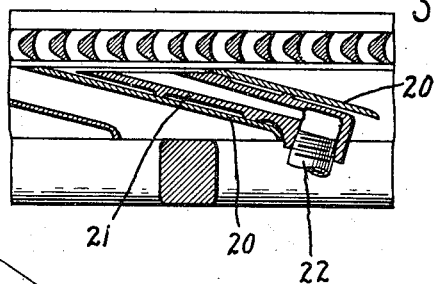
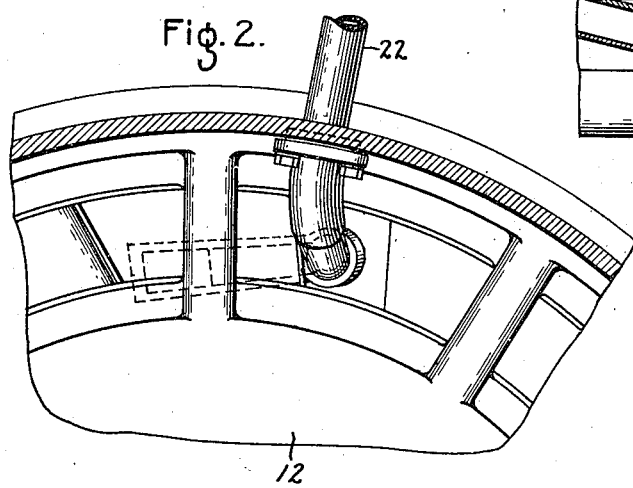

HARVEY N. DAVIS, OF CAMBRIDGE, MASSACHUSETTS, ASSIGNOR TO GENERAL ELECTRIC COMPANY, A CORPORATION OF NEW YORK.

ELASTIC-FLUID TURBINE.

1,297,803.  Specification of Letters Patent.  Patented Mar. 18, 1919.

Application filed September 19, 1918. Serial No. 254,749.

*To all whom it may concern:*

Be it known that I, HARVEY N. DAVIS, a citizen of the United States, residing at Cambridge, county of Middlesex, State of Massachusetts, have invented certain new and useful Improvements in Elastic-Fluid Turbines, of which the following is a specification.

In connection with multi-stage turbines which are designed to operate condensing but which may sometimes be required to operate non-condensing, it has been found that better efficiency is obtained when operating non-condensing if the elastic fluid is exhausted from an intermediate stage of the machine rather than from the final stage. This has led to the provision in connection with such turbines of an auxiliary exhaust conduit leading from an intermediate stage which may be used when the machine is operating non-condensing. Such a conduit may also be used for extracting elastic fluid for industrial purposes. However, when such turbines are operating non-condensing and exhausting from an intermediate stage, which means that the wheels in one or more of the low pressure stages are running idle, there is danger, due to the rotation of the wheels continually heating the steam atmosphere surrounding them, of over-heating such wheels which may result in considerable damage, and the object of the present invention is to provide an improved arrangement for cooling the idle wheels when a multi-stage machine is operating non-condensing after the manner referred to.

For a consideration of what I believe to be novel and my invention, attention is directed to the accompanying description and the claims appended thereto.

In the accompanying drawing, Figure 1 is a side elevation, partly in section, of an elastic-fluid turbine embodying my invention; Fig. 2 is a face view of a portion of the last stage nozzle diaphragm, the casing of the turbine being shown in section, and Fig. 3 is a section taken on line 3—3, Fig. 1.

According to my invention, I provide in connection with the diaphragm of a stage of the machine lower than that from which the auxiliary exhaust conduit leads, a special nozzle means to which high pressure elastic fluid is adapted to be supplied through a suitable conduit. Such nozzle means may take the form of one or more nozzles located between partition blades of the diaphragm, and elastic fluid may be supplied thereto from an earlier stage of the machine if the pressure therein is sufficiently high, or from any other suitable source of supply.

Now, when the machine is operating non-condensing and exhausting from an intermediate stage, high pressure elastic fluid is supplied to this special nozzle means and such elastic fluid is expanded therein after which it impinges upon and has a portion of its energy extracted by the buckets of the wheel in the stage in which the nozzle means is associated. During this process the pressure of the elastic fluid is reduced to a point where it is sufficiently cool to serve as an efficient cooling medium. The elastic fluid, after it has done work on such wheel, then flows through the lower stages of the machine to cool the same. If the nozzle means is associated with a diaphragm at a point above the last stage of the machine, then the cooling fluid will divide, a part of it flowing backward toward the auxiliary exhaust conduit and exhausting through such auxiliary conduit and the remainder flowing on through the last stages of the machine and exhausting to atmosphere through the normal exhaust conduit. On the other hand, if the auxiliary nozzle means is associated with the last stage of the machine then elastic fluid supplied thereto, after it has done work on the last stage wheel flows backward from the last stage of the machine toward the first stage passing successively through the lower stages and exhausting through the conduit leading from the intermediate stage. By this means an efficient cooling medium is provided and at the same time a considerable portion of the energy in the elastic fluid used for cooling is efficiently utilized.

In the present instance the invention is illustrated in connection with a three-stage machine, the first stage having a wheel carrying two rings of buckets and the second and third stage each having a wheel with a single ring of buckets. It will be understood, however, that the invention may be carried out in connection with any turbine having a plurality of stages.

Referring to the drawing, 5 indicates the casing of an elastic-fluid turbine and 6 a shaft upon which are mounted the bucket wheels of the machine. In the present instance the turbine casing is divided into three stages by diaphragms 7 and 8. 9 indicates the wheel in the first stage carrying two rings of buckets 10, 11 and 12 indicate the wheels in the second and third stages respectively, each carrying a single ring of buckets 13 and 14. Elastic fluid is admitted to the high pressure end of the machine by a conduit 15 and after passing through the successive stages exhausts into the head 16 having an exhaust opening 17 which leads to a condenser (not shown) in the well understood manner. Leading from the first stage of the machine is an auxiliary exhaust conduit 18 having a valve 19 therein. 20 indicates the nozzle partitions in the diaphragm 8 which direct elastic fluid to the ring of buckets 14 on wheel 12, and located between two of these nozzle partitions 20 is an auxiliary nozzle 21 (Fig. 3) to which is connected a conduit 22 leading from a suitable supply of high pressure elastic fluid as the conduit 15. In conduit 22 is a hand valve 23.

In the present instance, the diaphragm 7 is shown as being provided with a ring valve 24 which is used to control the flow of elastic fluid from the first stage to the second stage. Such a valve is provided for use when elastic fluid is being extracted from the machine for industrial purposes to maintain a constant pressure in the extraction stage as is well understood.

When the machine is operating condensing the valve 19 may be closed or it may be open if elastic fluid is being extracted from the first stage. In any event, the turbine operates as an ordinary condensing machine in the well known manner. When the machine is operating non-condensing, the valve 19 is open and the high pressure elastic fluid having had its energy extracted by the two rings of buckets 10, passes out through the auxiliary exhaust conduit 18. At such times valve 23 is opened to admit high pressure elastic fluid to the nozzle 21. Here it has its pressure converted into velocity and impinges against the ring of buckets 14 whereby a portion of the energy is extracted, the elastic fluid exhausting from the buckets at a suitable temperature and pressure to make it an efficient cooling medium. For example, it may have a pressure about or slightly above atmospheric. The elastic fluid from the last stage then flows backward through or around the ends of the ring of buckets 14, the nozzles of the diaphragm 8, through or around the ends of the ring of buckets 13, and the nozzles of diaphragm 7 to the first stage of the machine from which it exhausts through conduit 18 along with the elastic fluid from the rings of buckets 10.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. The combination with an elastic-fluid turbine having an exhaust conduit leading from an intermediate stage through which the turbine may exhaust when operating non-condensing, of nozzle means for supplying elastic fluid to the buckets of a stage of the machine lower than that from which said exhaust conduit leads, such elastic fluid after exhausting from said buckets circulating through the lower stages of the machine to cool the same.

2. The combination with an elastic-fluid turbine having an exhaust conduit leading from an intermediate stage through which the turbine may exhaust when operating non-condensing, of nozzle means for supplying elastic fluid to the buckets of a stage of the machine lower than that from which said exhaust conduit leads, elastic fluid after exhausting from said buckets flowing backward through the machine to said intermediate stage.

3. The combination with an elastic-fluid turbine having an auxiliary exhaust conduit leading from an intermediate stage through which the turbine may exhaust when operating non-condensing, of a nozzle means associated with the last stage diaphragm, and means for supplying elastic fluid thereto, whereby when the machine is exhausting through said auxiliary exhaust conduit, elastic fluid may be supplied to said nozzle means to provide a cooling medium for cooling the stages of the machine located beyond the stage to which the said auxiliary exhaust conduit is connected.

In witness whereof I have hereunto set my hand this nineteenth day of September, 1918.

HARVEY N. DAVIS.